March 17, 1931.  I. W. BROGGER  1,796,919

ENGINE OIL LEVEL INDICATOR MECHANISM

Filed Aug. 18, 1928

INVENTOR

IVAR W. BROGGER

BY A. D. T. Libby

ATTORNEY

Patented Mar. 17, 1931

1,796,919

UNITED STATES PATENT OFFICE

IVAR W. BROGGER, OF IRVINGTON, NEW JERSEY

ENGINE-OIL-LEVEL INDICATOR MECHANISM

Application filed August 18, 1928. Serial No. 300,410.

This invention relates to an engine oil level indicating mechanism especially adapted for use in connection with engines used in automotive vehicles.

In certain makes of automobiles, there are no oil gauges provided by the manufacturer and in certain other makes, while an oil gauge is provided on the cowl and connected with the pump, such a system while indicating that there is some oil in the engine, does not show the true contents; that is to say, the oil may be nearly exhausted in the engine crank case and the pump will keep on pumping this, showing oil on the gauge just as though the engine had its normal requirement of oil therein.

It is the object of my invention to provide an oil level indicating mechanism which will at least indicate the low level, so that the operator will be given a warning that it is time to put oil in the engine.

My invention will be readily understood by reference to the attached drawing, wherein.

Figure 1:
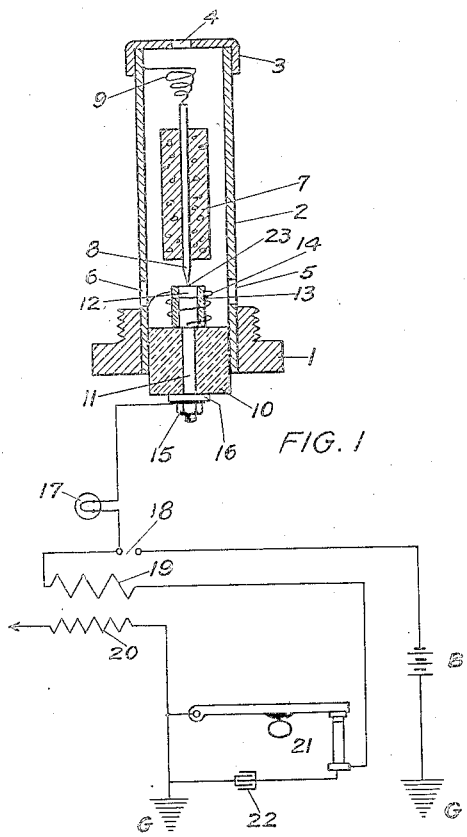
Figure 1 is a somewhat schematic scheme of my arrangement.

Referring now to the details wherein like numbers correspond to the various parts in the drawing, 1 is a screw plug to fit a certain make of well-known engine used in the automotive trade, and to this plug is securely fitted, preferably by press fit, a casing 2, preferably cylindrical in shape. The casing 2 has a cap 3 with a breather hole 4 therein; also holes 5 and 6, so as to allow the oil in the engine crank case to enter these holes and fill or partially fill the casing 2, depending on the height of the oil in the engine crank case. The case 2 is provided with an insulating bushing 10 fitting oil tight in casing 2 that carrier a contact stud 11. Preferably the stud 11 has a head 12 slightly enlarged from the body of the stud, and the head 12 preferably carries an insulator 13.

Around the insulator 13 is positioned a resistance 14, one end of which is connected to the contact 11, and the other end to the casing 2. Within the casing 2, is carried a float 7 carrying a contact member 8. The contact member 8 is connected to casing 2 by a suitable flexible means in the form of a spiral spring 9. This arrangement insures a continuous and positive connection between the float contact 8 and the casing 2.

The stud 11 is fastened into the bushing 10 by any satisfactory means, as by a nut 15 and washer 16, and to the stud 11 is connected one terminal of a signal, preferably in the form of a small incandescent lamp 17, the other terminal of which is connected to a switch 18 which may be the ignition switch.

Figure 2:
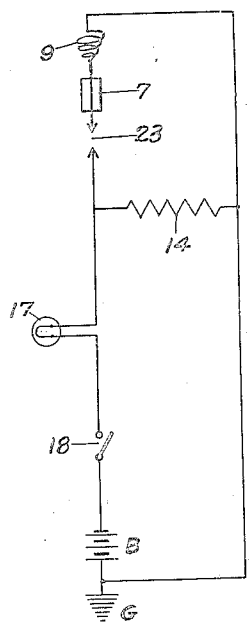
Figure 2 is a diagrammatic illustration showing the arrangement of the electric circuit more clearly than Figure 1.

A simplified ignition circuit is shown in Figure 1, consisting of the circut breaker 21, condenser 22, primary 19 of the spark coil, and 20 indicating the secondary. Current is supplied to the ignition system by the battery B through the switch 18. As will be seen from the diagram in Figure 2, when the switch 18 is closed, and assuming that the oil level in the engine is at a point sufficient to raise the float 7 to separate the contacts 23, current will flow through the lamp 17 and the resistance 14, which is of relatively high resistance as compared with the lamp. The circuit thus completed through the resistance 14, causes the lamp 17 to barely glow, indicating to the operator that the signal or lamp is in working condition. When the oil in the engine has been used up so that the level brings the float 7 downward to the position shown in Figure 1, the contact 23 is closed, thereby short-circuiting the resistance 14 and allowing the signal or the lamp 17 to increase its signaling ability; that is to say, if a lamp is used, the lamp will increase materially in its candle power, thereby warning the operator that the oil in the engine has reached low level and that more oil is required.

It is seen in Figure 1, that I have provided a complete unitary structure which can be quickly inserted in place of any of the present standard plugs used in the engine. These plug units may be made up according to the size of the plugs used in different makes of engines, so that my arrangement is applicable to more than one make of engine.

I have found that the use of the resistance 14 as indicated, has an additional function and that is, it warms up the oil in the immediate vicinity of the contacts 23 and produces a circulation of the oil through the chamber formed by the casing 2. This tends to keep the contact surfaces in the best of condition and therefore, I have preferred to place the holes 5 and 6 substantially in alignment with the contacts 23.

It is also to be understood that my unitary structure may be mounted in any engine by drilling and tapping a new hole for the plug of the unit. Furthermore, the resistance 14 may in some cases be eliminated and when it is not used, the signal circuit may be provided with a test switch whereby the operator may at any time close a signal circuit through the signal and the source of current to show that the signal is in working condition.

It will be obvious that other of the details may be varied without departing from the spirit of my invention, and the scope of the appended claims.

Having thus described my invention, what I claim is:

1. An engine oil level indicating mechanism including; a drain plug for the engine crank case, a casing attached to the plug and having openings to allow the oil in the engine crank case to enter the casing, an electrical contact member extending through but insulated from the plug and casing, a relatively high resistance carried by said contact member and connected between it and said casing, a float supported by the oil within the casing, a contact carried by the float for engagement with the first-mentioned contact, means for permanently connecting said float contact to said casing in such a manner as not to interfere with the movement of the float, and a signal adapted to be connected into a circuit including a source of current and said contacts and resistance.

2. An engine oil level indicating mechanism including; a drain plug for the engine crank case, a casing attached to the plug and having openings to allow the oil in the engine crank case to enter the casing, an insulator positioned in the plug end of the casing, a contact member extending through the insulator into the interior of the casing, a relatively high resistance carried within the casing and connected between it and said contact member, a float carried by the oil within the casing and having a contact to engage the first contact when the low position of the float is reached, means for continuously connecting the float contact to the casing and a signal adapted to be connected into a circuit including the resistance and said contacts in parallel relationship for the purposes described.

3. An engine oil level indicating mechanism including; a standard drain plug for the engine crank case, a casing carried by the plug and having openings to allow the oil in the engine crank case to enter within the casing, an insulator closing the end of the casing in the plug, a contact member extending through the insulator into the interior of the casing, a relatively high resistance carried within the casing and connected between it and said contact member, a float carried by the oil within the casing and having a contact to engage the first contact when the low position of the float is reached, means for continuously connecting the float contact to the casing and a signal adapted to be connected into a circuit including the resistance and said contacts in parallel relationship for the purposes described.

4. An engine oil level indicating mechanism comprising; a signal lamp and a unitary structure to be inserted into an engine crank case, said unitary structure including; a plug to be screwed into the crank case, a tubular casing, having openings to allow the engine oil to enter therein, carried by the plug, an insulator closing the plug end of the tube, a contact member passing through the insulator to the interior of the casing, a resistance carried within the casing and connected between the casing and said contact, a float within the casing, a contact carried by the float, means for insuring a positive contact between the casing and the float contact, and means for connecting the lamp into a circuit including a source of current and said contacts and resistance, the latter two being in parallel relationship for the purposes described.

5. An engine oil level indicating mechanism comprising; a signal and a unitary structure to be inserted into an engine crank case, said unitary structure including; a plug to be attached into the crank case, a casing, having openings to allow the engine oil to enter therein, attached to the plug, an insulator carried at the end of the casing, a contact carried by the insulator and projecting within the casing, a float within the casing, a contact carried by the float, means for insuring a positive contact at all times between the casing and the float contact, a source of current, a resistance connected across the contact carried by the float, and the casing, a switch for connecting the signal into a circuit including said source of current and said resistance, whereby when the switch is closed, the signal will give a constant indication, said resistance being short-circuited by said contacts when the float reaches its low level position, thereby increasing the signal characteristics of said signal.

6. An engine oil level indicating mechanism comprising; a signal and a unitary structure to be inserted into an engine crank case, said unitary structure including; a plug to be interchangeable with and to fit the standard drain hole in the bottom of an engine crank case, a casing having openings to allow the engine oil to enter therein, attached to the plug, an insulator at the plug end of the casing, a contact carried by the insulator and projecting within the casing, a resistance carried within the casing and connected between it and said contact, a float within the casing, a contact carried by the float, a flexible spring connected between the casing and the float contact, a switch for connecting the signal into a circuit including a source of current and said contacts and resistance whereby said signal gives a continuous indication through the resistance that it is in working order, said resistance being eliminated by closure of said contacts when the float reaches its low level position thereby increasing the signal characteristics of said signal.

7. An engine oil level indicating mechanism including; a drain plug for the engine crank case, a casing attached to the plug and having openings to allow the oil in the engine crank case to enter the casing, an electrical contact member extending through but insulated from the plug and casing, a float supported by the oil within the casing, a contact carried by the float for engagement with the first-mentioned contact, means for permanently connecting said float contact to said casing in such a manner as not to interfere with the movement of the float, and a signal adapted to be connected into a circuit including a source of current.

8. An engine oil level indicating mechanism including; a drain plug for the engine crank case, a casing attached to the plug and having openings to allow the oil in the engine crank case to enter the casing, an electrical contact member extending through but insulated from the plug and casing, a resistance carried by said contact member and connected between it and said casing, a float supported by the oil within the casing, a contact carried by the float for engagement with the first-mentioned contact, means for permanently connecting said float contact to said casing in such a manner as not to interfere with the movement of the float, said casing having openings substantially in alignment with said contacts whereby the oil is circulated around said contacts by the warming of the oil from said resistance, and a signal adapted to be connected into a circuit including a source of current and said contacts and resistance.

In testimony whereof, I affix my signature.

IVAR W. BROGGER.